(12) United States Patent  (10) Patent No.: US 9,209,859 B1
Schwarzwalder et al.  (45) Date of Patent: Dec. 8, 2015

(54) SIGNAL PROCESSING

(75) Inventors: Joseph J. Schwarzwalder, Bristow, VA (US); James C. Rector, Warrenton, VA (US); Robert L. Kettig, Herndon, VA (US)

(73) Assignee: The Boeing Company, Chicago, IL (US)

( * ) Notice: Subject to any disclaimer, the term of this patent is extended or adjusted under 35 U.S.C. 154(b) by 885 days.

(21) Appl. No.: 13/272,064

(22) Filed: Oct. 12, 2011

(51) Int. Cl.
 *H03K 9/00* (2006.01)
 *H04L 27/00* (2006.01)
 *H04B 1/7103* (2011.01)

(52) U.S. Cl.
 CPC .................................. *H04B 1/7103* (2013.01)

(58) Field of Classification Search
 USPC ................ 375/219, 259, 316, 377, 220, 222, 375/240.29, 260, 284, 285, 295, 346, 347, 375/350, 323, 324, 325, 328, 240, 375/240.26–240.27, 299, 340, 345, 358
 See application file for complete search history.

(56) References Cited

U.S. PATENT DOCUMENTS

| | | | |
|---|---|---|---|
| 6,466,958 B1 | 10/2002 | Van Wechel et al. | |
| 6,898,235 B1 | 5/2005 | Carlin et al. | |
| 7,185,038 B2 | 2/2007 | Van Wechel et al. | |
| 7,430,254 B1 * | 9/2008 | Anderson | 375/342 |
| 8,045,654 B1 * | 10/2011 | Anderson | 375/342 |
| 2005/0276335 A1 * | 12/2005 | Kumar | 375/260 |
| 2007/0297541 A1 | 12/2007 | McGehee | |
| 2008/0310522 A1 * | 12/2008 | Feller | 375/260 |
| 2011/0158343 A1 * | 6/2011 | Park et al. | 375/285 |
| 2011/0305198 A1 * | 12/2011 | Aue et al. | 370/328 |
| 2012/0095753 A1 * | 4/2012 | Nakajima et al. | 704/200 |
| 2012/0321010 A1 * | 12/2012 | Laudel | 375/267 |
| 2013/0021197 A1 * | 1/2013 | Jiang | 342/195 |

* cited by examiner

*Primary Examiner* — Linda Wong
(74) *Attorney, Agent, or Firm* — Toler Law Group, PC

(57) ABSTRACT

A method for detecting a signal includes channelizing a digitized radio frequency (RF) environment to generate first tier channel outputs. The digitized RF environment includes a first bandwidth. Each first tier channel output has a second bandwidth smaller than the first bandwidth. Each first tier channel output overlaps at least a portion of at least one adjacent first tier channel output. One or more of the first tier channel outputs are channelized to generate multiple second tier channel outputs. Each second tier channel output has a third bandwidth that is smaller than the second bandwidth. Each second tier channel output overlaps at least a portion of at least one adjacent second tier channel output. The method includes performing a comparison of signal data from each second tier channel output to first signal feature data and determining whether a potential target signal is present in the digitized RF environment.

20 Claims, 7 Drawing Sheets

SIGNAL PROCESSING

FIELD OF THE DISCLOSURE

The present disclosure is generally related to signal processing.

BACKGROUND

Detection of a narrow band signal transmitted at unknown time, frequency, amplitude, and phase and in a wideband, cluttered radio frequency noise environment imposes technical challenges. Detection techniques typically have to contend with finding a threshold to reduce false alarms while providing reliable detection. As a minimum duration of spectral events required to qualify for processing is lowered, the number of events observed increases exponentially. This is also true as the allowable signal to noise ratio (SNR) is lowered. These factors make reliable detection of low SNR and short duration signals increasingly challenging.

SUMMARY

Detection of a target signal with an unknown transmission time, an unknown frequency, an unknown amplitude, and an unknown phase in a wideband, cluttered, noisy radio-frequency (RF) environment may be performed by exploiting known segments of the target signal. The detection may be performed using a matched filter processing technique. Detection of the target signal may include a two-tiered channelization process followed by two stages of increasingly refined feature based correlation detection processing. At a first tier of the channelization process, a digitized signal corresponding to a portion of the RF environment may be channelized into multiple channel outputs having substantially uniform spacing between adjacent channel outputs. Each channel output of the first tier channelization process may have a bandwidth that is smaller than the bandwidth of the digitized signal. At a second tier of the channelization process, each channel output from the first tier may be channelized into channel output having a smaller bandwidth and a substantially uniform spacing between adjacent channel outputs. The bandwidth of each channel output of the second tier channelization process may overlap with a portion of the bandwidth of at least one adjacent channel output of the second tier channelization process.

The channel outputs of the second tier channelization process may be provided to a first bank of correlation detectors that perform a first feature based correlation process, also referred to herein as a feature-1 correlation process. If the feature-1 correlation process indicates a potential target signal detection, a second feature (feature-2) based correlation, also referred to herein as a feature-2 correlation process, may be performed by a second bank of correlation detectors. Detection of the target signal may be performed using multi-rate signal processing, fast Fourier transform (FFT) techniques, and efficient constant false alarm rate (CFAR) processing. Detection of the target signal may be followed by signal specific demodulation and decoding of a detected target signal.

In a particular embodiment, a computer-implemented method for detecting a signal includes channelizing a digitized radio frequency (RF) environment to generate multiple first tier channel outputs. The digitized RF environment includes a first bandwidth and each first tier channel output has a second bandwidth smaller than the first bandwidth. Each first tier channel output overlaps at least a portion of at least one adjacent first tier channel output. The method includes channelizing one or more of the first tier channel outputs to generate multiple second tier channel outputs. Each second tier channel output has a third bandwidth that is smaller than the second bandwidth. Each second tier channel output overlaps at least a portion of at least one adjacent second tier channel output. The method further includes performing a comparison of signal data from each second tier channel output to first signal feature data and determining whether a potential target signal is present in the digitized RF environment based on the comparison.

In another particular embodiment, a non-transitory computer-readable medium includes computer-executable instruction that, when executed by a processor, cause the processor to channelize a digitized radio frequency (RE) environment to generate multiple first tier channel outputs. The digitized RF environment has a first bandwidth and each first channel output has a second bandwidth smaller than the first bandwidth. Each first tier channel output overlaps a portion of at least one adjacent first tier channel output. The instructions further cause the processor to channelize one or more of the first tier channel outputs to generate multiple second tier channel outputs. Each second tier channel output has a third bandwidth that is smaller than the second bandwidth. Each second tier channel output overlaps a portion of at least one adjacent second tier channel output. The instructions further cause the processor to perform a comparison of signal data from each second tier channel output to first signal feature data and to determine whether a potential target signal is present in the digitized RF environment based on the comparison.

In another particular embodiment, a system includes at least one processor and memory accessible to the at least one processor. The memory stores computer-executable instructions that, when executed by the at least one processor, cause the at least one processor to channelize a digitized radio frequency (RF) environment to generate multiple first tier channel outputs. The digitized RF environment includes a first bandwidth and each of the first channel outputs has a second bandwidth smaller than the first bandwidth. Each of the first tier channel outputs overlaps a portion of at least one adjacent first tier channel output. The instructions also cause the at least one processor to channelize one or more of the first tier channel outputs to generate multiple second tier channel outputs. Each of the second tier channel outputs has a third bandwidth that is smaller than the second bandwidth. Each of the second tier channel outputs overlaps a portion of at least one adjacent second tier channel output. The instructions further cause the at least one processor to perform a first comparison of signal data from each of the second tier channel outputs to first signal feature data and to determine whether a potential target signal is present in the digitized RF environment based on the first comparison.

The features, functions, and advantages that have been described can be achieved independently in various embodiments or may be combined in yet other embodiments, further details of which are disclosed with reference to the following description and drawings.

DETAILED DESCRIPTION

Figure 1:
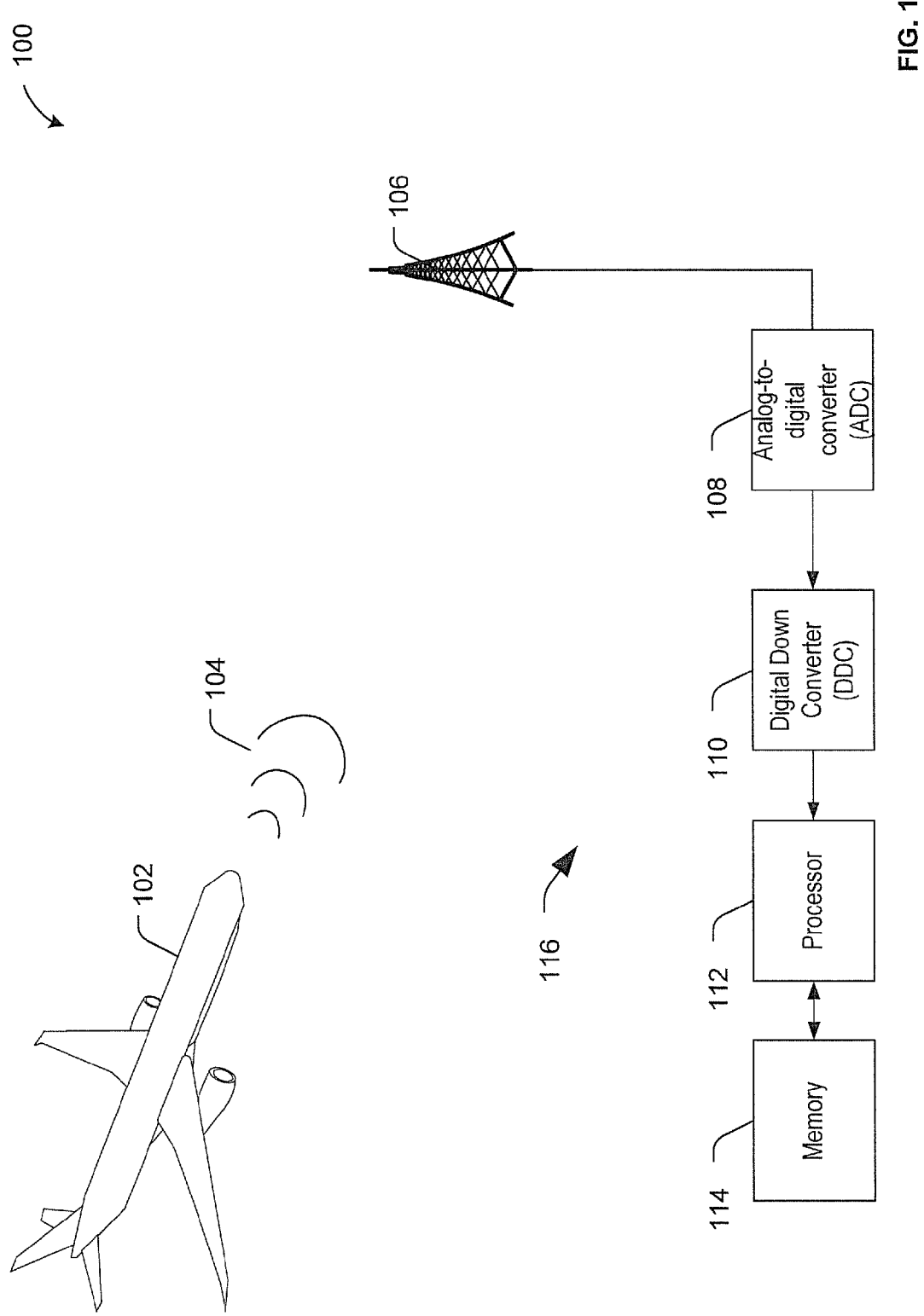
FIG. 1 is a diagram of a particular embodiment of a wireless communication system including a signal detection system.

FIG. 1 illustrates a particular embodiment of a wireless communication system 100 including a signal detection system 116 that is configured to detect a target signal 104. The target signal 104 may have an unknown transmission time, an unknown frequency, an unknown amplitude, and an unknown phase. The signal detection system 116 may be configured to detect the target signal 104 within a radio frequency (RF) environment, which may be wideband (as compared to the target signal 104), cluttered, and/or noisy.

The wireless communication system 100 may include a signal source 102 (depicted in FIG. 1 as an aircraft) that is configured to transmit the target signal 104. For example, the target signal 104 may be a low-probability of interception radar signal. In other example, the target signal 104 may be another type of signal that is transmitted with the unknown transmission time, the unknown frequency, the unknown amplitude, the unknown phase, or a combination thereof.

In a particular embodiment, the signal detection system 116 may be configured to monitor the RF environment to attempt to detect the target signal 104. For example, the signal detection system 116 may be a component of or portion of a threat detection system that monitors an area for potential threats. In this example, the signal source 102 may be identified as a potential threat or located based on the signal detection system 116 detecting the target signal 104.

The signal detection system may include a receiver 106 that is configured to receive the target signal 104 as part of the wideband radio-frequency (RF) environment and to provide data corresponding to the RF environment to other components of a signal processing system 116. The other components of the signal processing system 116 may include an analog-to-digital converter (ADC) 108, a digital down converter (DDC) 110, a processor 112, and a memory 114. The analog-to-digital converter 108 may be coupled to the receiver 106 and to the digital down converter 110. The digital down converter 110 may be coupled to the processor 112, and the processor 112 is coupled to the memory 114.

In a particular embodiment, the target signal 104 may be a relatively narrowband signal (e.g., less than 4 kHz bandwidth) relative to the RF environment. For example, the RF environment may include a 30 MHz frequency range that is of interest. The target signal 104 may have an unknown transmission time, an unknown frequency, an unknown amplitude, an unknown phase, and/or an unknown transmission sideband. In a particular embodiment, the target signal 104 may include a segment that has a feature known to the signal detection system 116. For example, the known segment may include a known training sequence.

The receiver 106 may provide an analog version of the received RF environment to the analog-to-digital converter 108. The analog-to-digital converter 108 may convert the received RF environment into a first digital signal that is provided to the digital down converter 110. The digital down converter 110 may receive the first digital signal from the analog-to-digital converter 108 and generate a digitized RF environment (i.e., a second digital signal). For example, the digital down converter 110 may receive the first digital signal and shift an intermediate frequency of the first digital signal to a lower frequency to generate the digitized RF environment. To illustrate, the digital down converter 110 may generate a baseband signal (i.e., a baseband digitized RF environment) by shifting the intermediate frequency of the first digital signal to zero. The digital down converter 110 may also perform low pass filtering and decimation. In a particular embodiment, the digitized RF environment output by the digital down converter 110 may have approximately a 2 MHz bandwidth and a data rate of approximately 2.5 mega samples per second (MSps).

The processor 112 may be configured to receive the digitized RF environment from the digital down converter 110 and to generate multiple channel outputs. The processor 112 may perform two-tier channelization of the digitized RF environment to generate the multiple channel outputs. During a first tier channelization, the processor 112 may channelize the digitized RF environment from the digital down converter 110 to generate multiple first tier channel outputs. The first tier channel outputs may have a smaller bandwidth than the digitized RF environment. In a particular embodiment, each first tier channel output may overlap a portion of at least one adjacent first tier channel output.

During a second tier channelization, the processor 112 may channelize one or more of the first tier channel outputs to generate multiple second tier channel outputs. The second tier channel outputs may have a smaller bandwidth than the first tier channel outputs. Each second tier channel output may overlap a portion of at least one adjacent second tier channel output. In a particular embodiment, the processor 112 may perform each of the first tier and second tier channelization using Fast Fourier Transform (FFT) techniques. The processor 112 may further provide the second tier channel outputs as inputs to a signal correlation stage and may store the second tier channel outputs in the memory 114 or in another storage buffer.

The processor 112 may be further configured to perform signal correlation processing based on the second tier channel outputs to detect feature data of the target signal 104. The processor 112 may perform the feature based correlation processing in two or more stages. For ease of description, two feature based correlation processing stages are referred to herein as a feature-1 processing stage and feature-2 processing stage. At the feature-1 processing stage, the processor 112 may perform a comparison of signal data from each second tier channel output to first signal feature data (also referred to herein as "feature-1"). The first signal feature data may correspond to a first portion of a training sequence of the target signal 104. The first comparison may include a first cross-correlation of the signal data from each second tier channel output to the first signal feature data. A potential target signal may be determined to be present when the signal data has at least a threshold correlation to the first signal feature data. To illustrate, the potential target signal is determined to be present when the first cross-correlation satisfies a first threshold. The processor 112 may generate an alarm signal corresponding to each second tier channel output that has a feature-1 match to indicate the detection of a potential target signal. The first threshold may be adjustable or tunable to adjust sensitivity or a rate of false positive feature-1 matches generated by the first cross-correlation. In a particular embodiment, when a cluster of detections is determined (i.e., when the potential target signal is detected in more than one second tier channel output during the feature-1 processing stage), the cluster of detections may be reduced by arbitration to a single feature-1 alarm.

At the feature-2 processing stage, the processor 112 may perform a second comparison of signal data from a particular second tier channel output to second signal feature data (also referred to herein as "feature-2"). The second signal feature data may correspond to a second portion of the training sequence of the target signal 104. For example, the second portion of the training sequence may be different from the first portion of the training sequence, and the second portion may be larger than the first portion. In a particular embodiment, the second portion of the training sequence may include the first portion of the training sequence (i.e., the feature-1 may be a subset of the feature-2). The particular second tier channel output that is analyzed in the feature-2 processing stage may be a second tier channel output that has a feature-1 match. The second comparison may include a second cross-correlation of the particular second tier channel output to the second signal feature data. The potential target signal may be indicated to be present when the second cross-correlation satisfies a second threshold. The second threshold may be adjustable or tunable (in conjunction with or independently of the first threshold) to adjust sensitivity or a rate of false positive feature-2 matches generated by the second cross-correlation. The processor 112 may generate an alarm signal to indicate the detection of the potential target signal. In a particular embodiment, the processor 112 may perform the feature-2 processing stage in response to determining that the potential target signal 104 is present in at least one first tier channel output. The processor 112 may generate an alarm signal corresponding to each second tier channel output that has a feature-2 match to indicate the detection of a potential target signal.

The processor 112 may record snapshots related to all feature-1 alarms. For example, second tier channel outputs that have a feature-1 match may be recorded (e.g., stored at the memory 114) to enable post-processing, such as demodulation and decoding, following feature-2 alarms. The processor 112 may also retrieve a second tier channel output from a storage buffer for both feature-1 and feature-2 processing.

In response to indication of presence of the potential target signal in the RF environment at one or more frequencies corresponding to the particular second tier channel output, the processor 112 may demodulate data received via the one or more frequencies corresponding to the particular second tier channel output. The processor 112 may further perform error correction of the demodulated data to form error-corrected data. The processor 112 may analyze the error-corrected data and may indicate presence of the target signal 104 in the RF environment based on the analysis of the error corrected data.

In an alternative embodiment, one or more of the demodulation, error correction, analysis of the error-corrected data, and indication presence of the target signal 104 in the RF environment may be performed by a component other than the processor 112. Further, although only one processor is illustrated in FIG. 1, the processor 112 may include multiple processors or processing systems (e.g., application specific processing components) that operate together to implement functions described herein as performed by the processor 112. For example, the processor 112 may include multiple processors that operate in parallel, sequentially or partially in parallel and partially sequentially to channelize the digitized RF environment, to perform signal correlation, to demodulation, error correct and analyze data, and so forth.

During operation, the receiver 106 may provide sampled data from the RF environment to the analog-to-digital converter 108. The analog-to-digital converter 108 may convert the sampled RF environment into a digital signal and provide the digital signal to the digital down converter 110. The digital down converter 110 may perform frequency shifting, low pass filtering, and decimation and generate a digitized RF environment. The processor 112 may receive the digitized RF environment and perform a two-tier channelization to generate multiple channel outputs. The processor 112 may perform feature-1 processing based on one or more of the multiple channel outputs of the two-tier channelization. If the processor 112 detects presence of the potential target signal in any of the multiple channel outputs based on the feature-1 processing, the processor 112 may perform feature-2 processing. The processor 112 may perform the feature-2 processing based on one or more of the multiple channel outputs of the two-tier channelization that have a feature-1 match. If the processor 112 detects presence of the potential target signal 104 in any of the multiple channel outputs based on the feature-2 processing, the processor 112 may indicate the presence of the potential target signal 104 in the RF environment. The processor 112 may also perform target signal specific demodulation based on one or more of the multiple channel outputs that have a feature-2 match. The processor 112 may further perform error correction on the demodulated data and analyze the output of the error correction. The processor 112 may indicate presence of the target signal 104 in the RF environment based on the analysis of the output of the error correction.

Although FIG. 1 illustrates one analog-to-digital converter, one digital down converter, and one signal detection system, in alternative embodiments, multiple signal detection systems may operate in conjunction with one or more analog-to-digital converters that are each coupled to a corresponding digital down converter of multiple digital down converters. Higher total bandwidth of the RF environment may be processed by utilizing multiple signal detection systems that operate independently and operate on non-overlapping or partially overlapping frequency ranges of the RF environment. Alternatively, a processor, such as processor 112, may independently process multiple digitized RF environments that are provided by independent analog-to-digital converters.

Accordingly, the signal detection system 116 that includes the processor 112 and the memory 114 may detect a signal, such as the target signal 104, that may have an unknown transmission time, an unknown frequency, an unknown amplitude, an unknown phase, or any combination thereof, by exploiting a known feature of the signal. By performing the signal correlation in two steps and performing the feature-2 comparison based on channel outputs that have a feature-1 match, difficult RF targets in a high frequency environment may be detected.

Figure 2:
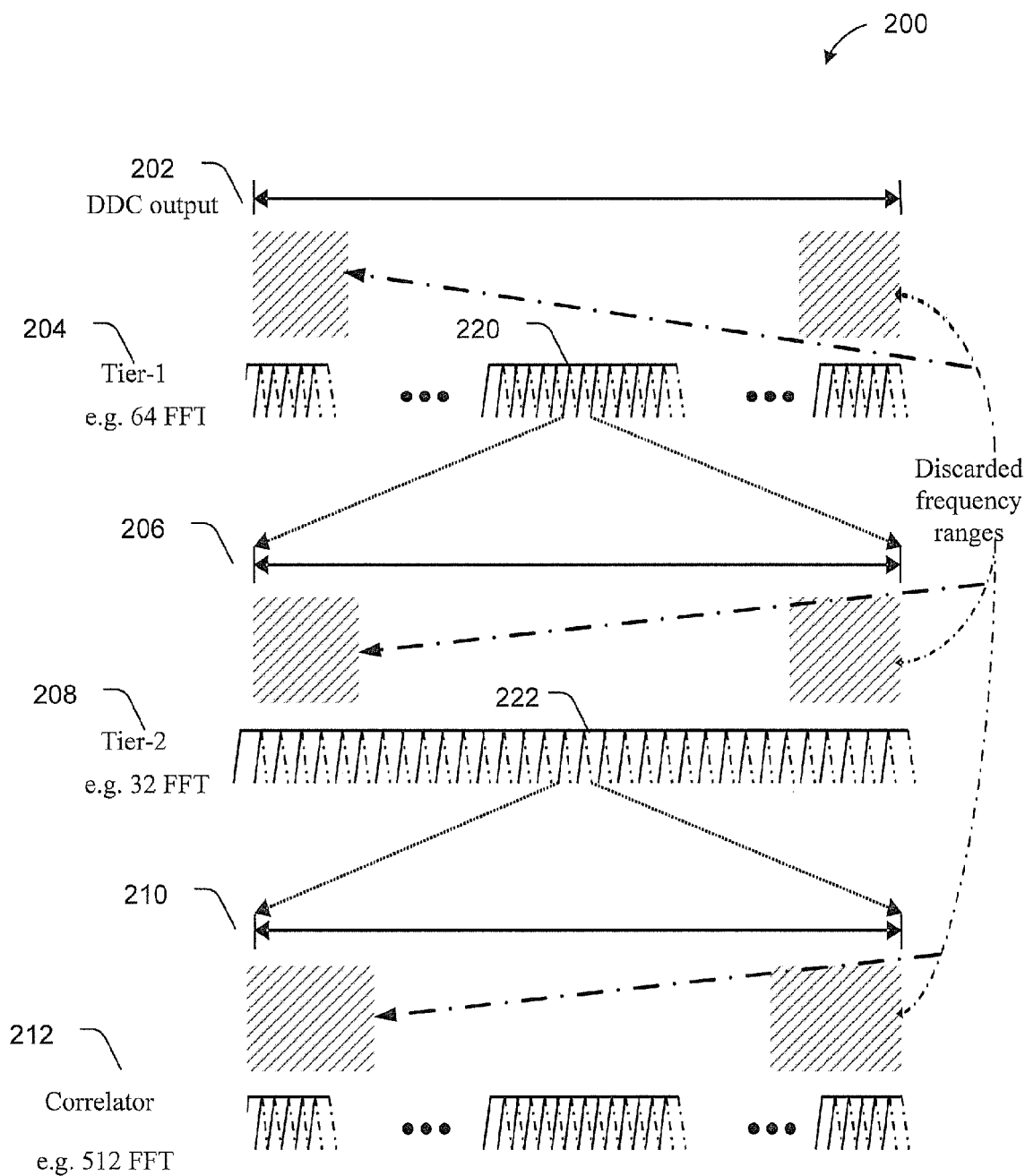
FIG. 2 is a diagram illustrating stages corresponding to operations of the signal detection system of FIG. 1.

FIG. 2 illustrates various stages that correspond to operations of the signal detection system 116 of FIG. 1. The various stages may include a Tier-1 stage 204, a Tier-2 stage 208, and a Correlator stage 212. The Tier-1 stage 204 and the Tier-2 stage 208 operate to generate multiple channels that are sized to a search bandwidth for use by the Correlator stage 212 to detect the target signal 104 in an RF environment. Digital Down Converter (DDC) 202 output may correspond to a digitized RF environment that is generated by the DDC 110 of FIG. 1. The DDC output 202 (i.e., the digitized RF environment) may include a first bandwidth (e.g., 2 MHz). The DDC output 202 may also include a frequency range that is outside the first bandwidth. For example, some frequencies that are outside the first bandwidth may correspond to frequencies introduced by other signal and noise sources. The DDC output 202 may further include the target signal 104 that has unknown transmission time, unknown frequency, unknown amplitude, and unknown phase. The target signal 104 may be a narrowband signal (e.g., 4 kHz bandwidth).

The DDC output 202 may be received at the Tier-1 204 stage, and frequencies of the DDC output 202 that are outside of the first bandwidth may be discarded. For example, the processor 112 of FIG. 1 may receive the DDC output 202 and filter out (i.e., discard) frequencies that are outside the first bandwidth. Channelization may be performed on the filtered DDC output 202 to generate multiple first tier channel outputs 220. In a particular embodiment, the processor 112 of FIG. 1 may perform channelization of the DDC output 202 to generate multiple first tier channel outputs 220 without discarding frequencies that are outside the first bandwidth.

Each of the first tier channel outputs 220 has a second bandwidth that is smaller than the first bandwidth. Each first tier channel output 220 may overlap a portion of at least one adjacent first tier channel output 220 sufficiently for the potential target signal to be recovered from a single first tier channel output 220 without distortion. In a particular embodiment, the multiple first tier channel outputs 220 are 78.125 kHz from center to center. Each of the multiple first tier channel outputs 220 may cover an 84.625 kHz bandwidth (i.e., 78.125 kHz spacing+6.50 kHz extra passband bandwidth) and may have a data rate of 156.250 kilo samples per second (kSps). The extra passband bandwidth (i.e., the 6.5 kHz) allows sufficient overlap between adjacent first tier channel outputs 220 that the target signal 104 (e.g., a 4 kHz bandwidth target signal) can straddle adjacent first tier channel outputs 220 and be recoverable in either channel output without distortion.

In a particular embodiment, the processor 112 may perform channelization to generate the multiple first tier channel outputs 220 based on FFT, such as a 64-point FFT. Each of the multiple first tier channel outputs 220 may be provided to a subsequent channelization stage, such as the Tier-2 stage 208.

At the Tier-2 stage 208, one or more first tier channel outputs may be channelized to generate second tier channel outputs. For example, the processor 112 of FIG. 1 may channelize a first tier channel output 206 to generate multiple second tier channel outputs 222. In a particular embodiment, the processor 112 may discard frequencies that are outside of the second bandwidth or another desired bandwidth prior to channelizing the first tier channel output 206 to generate multiple second tier channel outputs 222.

Each of the second tier channel outputs 222 may have a third bandwidth that is smaller than the second bandwidth. Each second tier channel output may overlap a portion of at least one adjacent second tier channel output sufficiently for the potential target signal to be recovered from a single second tier channel output without distortion. In a particular embodiment, each second tier channel output has a passband bandwidth corresponding to a sum of a bandwidth of the target signal 104 and a separation between the multiple second tier channel outputs 222. For example, the multiple second tier channel outputs 222 may be spaced 2445.3125 Hz from center to center and each of the multiple second tier channel outputs 222 may cover 6.50 kHz bandwidth. Each second tier channel outputs may have a data rate of 9765.625 samples per second (Sps). The overlapping passband bandwidth allows sufficient overlap between adjacent second tier channel outputs that the target signal 104 (e.g., a 4 KHz target signal) can straddle two adjacent second tier channel outputs and be recoverable in either channel output without distortion. Target signals with a bandwidth that is less than the maximum recoverable target signal bandwidth can be retrieved directly from the second tier channel outputs. In a particular embodiment, the 6.50 kHz bandwidth of second tier channel outputs defines a region for estimating the background noise. For a target signal bandwidth of 4 kHz, the 6.50 kHz may provide a reasonable tradeoff between search efficiency for feature-1 processing versus smaller noise region.

In a particular embodiment, the processor 112 may channelize the first tier channel output 206 to generate the multiple second tier channel outputs 222 based on FFT, such as a 32-point FFT. Each of the multiple second tier channel outputs 222 may be subsequently processed at a signal correlation stage, such as at the Correlator stage 212.

At the Correlator stage 212, a feature based signal correlation process may be performed based on one or more of the second tier channel outputs 222 to detect a target signal 104 in the RF environment. For example, at a feature-1 processing stage of the Correlator stage 212, the processor 112 may perform a comparison of signal data from a second tier channel output 210 to first signal feature data (feature-1). The processor 112 may determine whether a potential target signal is present in the digitized RF environment based on the comparison. In a particular embodiment, the feature-1 based comparison implemented by the processor 112 corresponds to an operation of a filter bank of matched filter detectors. For example, the feature-1 based comparison by the processor may correspond to a filter bank of matched filter detectors with a spacing of approximately 38.1 Hz and operating at a sample rate of 9765.625 Sps, where a reference waveform used in the feature-1 comparison is approximately 26.2 milliseconds (msec) in duration. To illustrate, the filter bank of matched filter detectors may correspond to a filter bank of constant false alarm rate (CFAR) matched filter detectors. The processor 112 may perform the feature-1 based comparison based on FFT, such as a 512-pt FFT.

At a feature-2 processing stage of the Correlator stage 212, a second feature based signal correlation may be performed based on one or more of the second tier channel outputs 222 to detect the target signal 104. For example, the processor 112 of FIG. 1 may perform a second comparison of signal data from a particular second tier channel output, such as the second tier channel output 210, to second signal feature data (feature-2). The processor 112 may retrieve the second tier channel output 210 from a buffer. The processor 112 may perform the second comparison in response to determining that a potential target signal is present in at least one second tier channel output. To illustrate, the processor 112 may perform the second comparison based on one or more second tier channel outputs that have a feature-1 match. In a particular embodiment, feature-2 based comparison by the processor 112 corresponds to an operation of a filter bank of matched filter detectors. For example, the feature-2 based comparison by the processor may correspond to a filter bank of matched filter detectors with a spacing of approximately 10.0 Hz and operating at a sample rate of 9765.625 Sps, where a reference waveform used in the feature-2 comparison is approximately 50 msec in duration. To illustrate, the filter bank of matched filter detectors may correspond to a filter bank of constant false alarm rate (CFAR) matched filter detectors. The processor 112 may perform the feature-2 comparison based on FFT, such as a 512-pt FFT.

While the second tier channel outputs may be intended to enable recovery of the target signal in a single second channel output, channels may be recombined in an oversampled synthesizer architecture with proper design of the reconstruction filters to support detection of target signals with larger bandwidths. Additionally, unknown transmitter sideband orientation (upper/lower) may be supported by proper generation of a reference waveform including a known signal feature, followed by upper side band and lower side band specific feature-2 processing.

Accordingly, by channelizing the RF environment into a properly sized search bandwidth, target signals (e.g., target signals with less than 4 kHz bandwidth) can be recovered from a second tier channel without a multi-channel signal reconstruction. Feature-1 comparison provides an initial screening to limit the number of feature-2 operations that are active at any one time. Additionally, by focusing on second tier channel outputs that have a feature-1 match, a rigorous (e.g., high filter resolution and longer feature data duration) feature-2 comparison enables a reliable target signal detection in a cluttered RF noise environment.

Figure 3:
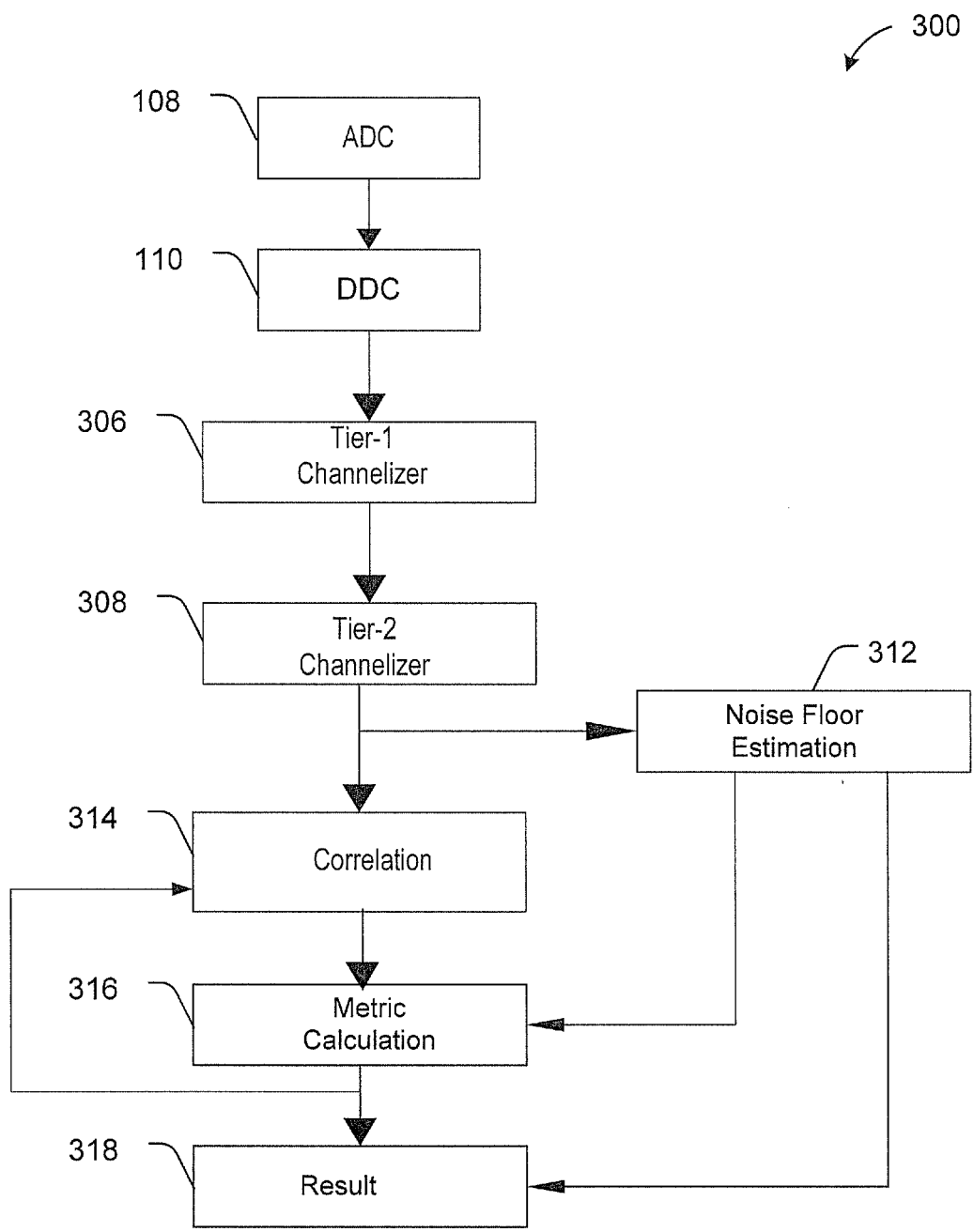
FIG. 3 is a block diagram of a first particular embodiment of a signal detection system.

FIG. 3 is a block diagram of an illustrative embodiment of a signal detection system 300 configured to detect a target signal that has unknown transmission time, unknown frequency, unknown amplitude, unknown phase, or a combination thereof. The system 300 includes the analog-to-digital converter (ADC) 108, the digital down converter (DDC) 110, a Tier-1 Channelizer 306, a Tier-2 Channelizer 308, a Noise Floor Estimation component 312, a Correlation component 314, a Metric Calculation component 316, and a Result component 318. The ADC 108 is coupled to the DDC 110. The DDC 110 provides a digitized RF environment to the Tier-1 Channelizer 306 that is coupled to the Tier-2 Channelizer 308. The Tier-2 Channelizer 308 is coupled to the Noise Floor Estimation component 312 and to the Correlation component 314. The Metric Calculation component 316 is configured to receive inputs from the Noise Floor Estimation component 312 and the Correlation component 314 and to determine whether a target signal is potentially present. The Result component 318 is configured to gather information from the Metric Calculation component 316 and the Noise Floor Estimation component 312 and to format the information for post processing.

As described with respect to FIG. 1, the ADC 108 converts an RF environment that may include the target signal 104 (shown in FIG. 1) into a digital signal. The target signal 104 may have unknown transmission time, unknown frequency, unknown amplitude, unknown phase or a combination thereof. The digital signal from the ADC 108 is provided to the DDC 110. The DDC 110 may perform frequency shifting, low pass filtering, and decimation to generate a digitized RF environment. The digitized RF environment is provided to the Tier-1 Channelizer 306.

The Tier-1 Channelizer 306 is configured to channelize the digitalized RF environment into multiple first tier channel outputs, such as the multiple first tier channel outputs 220 of FIG. 2. The first tier channel outputs may have a smaller bandwidth than the digitized RF environment. Each first tier channel output may overlap a portion of at least one adjacent first tier channel output. The multiple first tier channel outputs may be provided to the Tier-2 Channelizer 308 for channelization of one or more of the multiple first tier channel outputs. The Tier-2 Channelizer 308 may channelize one or more of the first tier channel outputs to generate multiple second tier channel outputs. The second tier channel outputs may have a smaller bandwidth than the first tier channel outputs. Each second tier channel output may overlap a portion of at least one adjacent second tier channel output. The multiple second tier channel outputs may be provided to the Noise Floor Estimation component 312 and the Correlation component 314. The second tier channel outputs may also be stored in a buffer.

The Correlation component 314, Noise Floor Estimation component 312 and the Metric Calculation component 316 may operate in conjunction with each other to determine the presence of a target signal in one or more second tier channel outputs generated by the Tier-2 Channelizer 308. The Correlation component 314 may perform a feature based correlation processing on one or more of the second tier channel outputs by taking advantage of unknown phase of a target signal as a nuisance parameter. At a feature-1 processing stage, the Correlation component 314 may receive the second tier channel outputs from the Tier-2 Channelizer 308 and perform a first feature correlation of each second tier channel output against a first known reference waveform (e.g., a digitized known reference waveform) corresponding to a first signal feature (feature-1) data. The first known reference waveform may have a first duration. The first feature correlation may correspond to an operation of a filter bank of matched filter detectors that have a first channel spacing. Using FFT techniques, a bank of processors may be used to implement normalized matched filter operations that perform the first feature correlation. An output of the first feature correlation may be provided to the Metric Calculation component 316.

The Noise Floor Estimation component 312 may use a weighted sliding window of a second tier channel output sample power as a localized estimate of background noise. The Noise Floor Estimation component 312 may receive one or more second tier channel outputs and provide estimated noise power data to the Metric Calculation component 316. For every time sample, the Metric Calculation component 316 may determine whether a result that is determined based on the estimated noise power data and an output of the first feature correlation is above a first threshold. A potential target signal is determined to be present if the result exceeds the first threshold. In a particular embodiment, the first threshold ranges between 0 and 1.0 at each time sample. For example, the first threshold may be set to 0.5. A particular threshold value may be predetermined, for example, based on analysis of statistics of noise. A cluster of potential detections may be produced, in time and frequency, as a target waveform moves through the processing chain. For a first feature correlation, the cluster of detections may be reduced to a single feature-1 alarm by arbitration.

The feature-1 processing stage provides an initial screening of second tier channel outputs to limit the number of second feature based correlations that operate at the same time. For example, during a feature-2 processing stage, the Correlation component 314 may perform a second feature correlation of only second tier channel outputs that have a feature-1 match. Further, an arbitration process may be implemented to limit the number of second tier channel outputs that may undergo feature-2 processing to one. The Correlation component 314 may perform the second feature correlation based on a second known reference waveform corresponding to second signal feature (feature-2) data. The second known reference waveform may be longer than the first known reference waveform, which lowers feature-2 false alarms. The second feature correlation may be implemented using FFT techniques and may correspond to an operation of a filter bank of matched filter detectors that have a second channel spacing that is smaller than the first channel spacing corresponding to the first feature correlation. Using FFT techniques, a bank of processors may be used to implement normalized matched filter operations to perform the second feature correlation.

The Result component 318 may be configured to receive information from the Metric Calculation component 316 and from the Noise Floor Estimation component 312 and to format the information for post processing. For example, the Result component 318 may receive information related to feature-1 and feature-2 alarms.

Processing of a binary detection problem and discrete time processing followed by an FFT-based implementation of normalized matched filters is described below. As described earlier, the FFT-based implementation of normalized matched filters may be used to perform feature-1 and feature-2 correlation processing. Processing of a binary detection problem and discrete time processing are first described as a foundation to the FFT-based implementation of normalized matched filters.

Processing of a binary detection problem makes a determination of which of two possible hypotheses are true given a particular observation. For the simple binary case, the two hypotheses are signal and noise or noise only and may be expressed as $$H_1 : r(t) = \sqrt{E_t}\, s(t) + w(t) \quad 0 \le t \le T \qquad (\text{Eq. 1})$$
$$H_0 : r(t) = w(t)$$

where the known signal s(t) is normalized such that $$\int_0^T |s(t)|^2 \, dt = 1 \qquad (\text{Eq. 2})$$

and $E_t$ is the transmitted energy. The matched filter for s(t) has impulse response $h(t)=s^*(T-t)$. The optimal detection process samples the output of the matched filter at time t=T and compares this value to a threshold. The value of the threshold is determined based on the probability density of the noise, various costs if using Bayes tests, or desired probability of false alarm for Neyman-Pearson tests.

General binary detection problems occur when there are signals present under both hypotheses and may be expressed as $$H_1 : r(t) = s_1(t) + w(t) \quad 0 \le t \le T$$

$$H_0 : r(t) = s_0(t) + w(t) \qquad (\text{Eq. 3})$$

In general, the detection problem is more complicated than the general binary case, in that the amplitude and phase of incoming signal are unknown. An assumption may be made that $s_1(t)$ is the signal of interest. The test is repeated on a frequent interval because the time of arrival is also unknown.

A solution to a particular detection problem case may be presented as $$\frac{\left|\int_0^T r(t) h(T-t)\, dt\right|^2}{\int_0^T |r(t)|^2 \, dt} \underset{H_0}{\overset{H_1}{\gtrless}} \text{threshold} \qquad (\text{Eq. 4})$$

The left side of the above equation, i.e., the detection metric, is the magnitude squared of the output of the matched filter normalized by the total power in the received signal over the observation interval. The detection metric takes on values [0,1].

In a discrete time processing system, the detection metric may be computed for every sample output from the matched filter. Given:

s(n) known reference waveform, n=0, ..., $N_s-1$,
r(n) received waveform,
h(n) $s^*([N_s-1]-n)$, impulse response of the matched filter,
y(n) the output of the matched filter,
w(n) circular symmetric, complex-valued, additive white Gaussian noise, $E\{|w(n)|^2\}=N_o/2$, and
z(n) total power in the received waveform over the interval, the matched filter output, y(n), may be computed for each received sample r(n).

$$r(n) = \sqrt{E_t}\, s(n) + w(n) \qquad (\text{Eq. 5})$$

$$y(n) = r(n) * h(n) \qquad (\text{Eq. 6})$$

$$= \sum_{m=-\infty}^{\infty} r(n-m) h(m)$$

$$= \sum_{m=0}^{N_s-1} r(n-m) h(m)$$

$$= \sum_{m=0}^{N_s-1} r(n-m) s^*([N_s-1]-m)$$

The total power, z(n), may be computed over the interval of interest $$z(n) = \sum_{m=0}^{N_s-1} |r(n-m)|^2 \qquad (\text{Eq. 7})$$

The above operation can be implemented in fixed point operations as add most recent, subtract oldest for efficiency, as there is no accumulated round-off error for sufficient sized bit widths. The detection metric is the ratio $$\frac{|y(n)|^2}{z(n)} \underset{H_0}{\overset{H_1}{\gtrless}} \text{threshold} \qquad (\text{Eq. 8})$$

For reduced complexity, the logarithm of the ratio may be compared to a suitably adjusted threshold and may be expressed as $$\ln(|y(n)|^2) - \ln(z(n)) \underset{H_0}{\overset{H_1}{\gtrless}} \text{threshold}' \qquad (\text{Eq. 9})$$

To deal with timing uncertainty and frequency uncertainty of a target signal, such as the target signal 104 of FIG. 1, a bank of normalized matched filter processors may be operated at a frequent update interval. By setting the frequency spacing of the bank of normalized match filter processors uniformly, efficient FFT based processing may be implemented. Assuming a search over a finite number, $N_k$ (where $N_k$ is an even number), of discrete frequencies, and $$\omega_k = 2\pi k / N_k, \qquad (\text{Eq. 10})$$

where $k=-N_k/2+1, \ldots, N_k/2$, the output of the $k^{th}$ matched filter is given by $$y_k(n) = r(n)e^{-j\omega_k n} * h(n) \quad \text{(Eq. 11)}$$

$$= \sum_{m=-\infty}^{\infty} r(n-m)e^{-j\omega_k(n-m)}h(m)$$

Factoring the complex exponential and accounting for the finite length of the matched filter impulse response $$y_k(n) = e^{-j\omega_k n} \sum_{m=-\infty}^{\infty} r(n-m)h(m)e^{j\omega_k m} \quad \text{(Eq. 12)}$$

$$= e^{-j\omega_k n} \sum_{m=0}^{N_s-1} r(n-m)h(m)e^{j\omega_k m} \quad \text{(Eq. 13)}$$

The magnitude squared of the matched filter output is as follows considering that the complex exponential outside the summation does not affect the value.

$$|y_k(n)|^2 = \left| e^{-j\omega_k n} \sum_{m=0}^{N_s-1} r(n-m)h(m)e^{j\omega_k m} \right|^2 \quad \text{(Eq. 14)}$$

$$|y_k(n)|^2 = |e^{-j\omega_k n}|^2 \left| \sum_{m=0}^{N_s-1} r(n-m)h(m)e^{j\omega_k m} \right|^2 \quad \text{(Eq. 15)}$$

$$|y_k(n)|^2 = \left| \sum_{m=0}^{N_s-1} r(n-m)h(m)e^{j\omega_k m} \right|^2 \quad \text{(Eq. 16)}$$

The matched filter impulse response as defined by the reference waveform, $s[n]$, is used in Eq. 16, resulting in $$|y_k(n)|^2 = \left| \sum_{m=0}^{N_s-1} r(n-m)s^*([N_s-1]-m)e^{j\omega_k m} \right|^2 \quad \text{(Eq. 17)}$$

Making the substitution $\beta=[N_s-1]-m$, and again factoring and removing the complex exponential term, $$|y_k(n)|^2 = \left| e^{j\omega_k[N_s-1]} \sum_{\beta=N_s-1}^{0} r(n-[N_s-1]+\beta)s^*(\beta)e^{-j\omega_k \beta} \right|^2 \quad \text{(Eq. 18)}$$

$$|y_k(n)|^2 = \left| \sum_{\beta=0}^{N_s-1} r(n-[N_s-1]+\beta)s^*(\beta)e^{-j\omega_k \beta} \right|^2 \quad \text{(Eq. 19)}$$

The DFT computes $y_k(n)$ for $$k = \frac{-N_k}{2}+1, \ldots, \frac{N_k}{2}$$

simultaneously.

$$|y_k(n)|^2 = |DFT\{r(n-[N_s-1]+\beta)s^*(\beta)\}|^2 k \quad \text{(Eq. 20)}$$
$$= \frac{-N_k}{2}+1, \ldots, \frac{N_k}{2}$$

The magnitude squared of the output of the $k^{th}$ matched filter consists of the magnitude squared of the DFT of the last $N_s$ input samples windowed with the conjugate of the desired waveform. Eq. 20 shows how the DFT operation, performed efficiently with an FFT implementation, may be part of computing the output of $N_k$ normalized match filter processors distributed uniformly in frequency.

During operation, the ADC 108 provides a digital signal that is converted from an RF environment of a first bandwidth to the DDC 110. The DDC 110 generates a digitized RF environment that is input to the Tier-1 Channelizer 306. The Tier-1 Channelizer 306 discards frequencies that are outside of the first bandwidth and channelizes the RF environment to generate a multiple first tier channel outputs. The Tier-2 Channelizer 308 channelizes one or more of the multiple first tier channel outputs from the Tier-1 Channelizer 306 to generate multiple second tier channel outputs. The second tier channel outputs are provided to the Noise Floor Estimation component 312 and to the Correlation component 314. The Noise Floor Estimation component 312 estimates the noise floor and provides the estimate to the Metric Calculation component 316.

The Correlation component 314 provides the output of the matched filter that is determined based on a first feature comparison to the Metric Calculation component 316. The Metric Calculation component 316 determines the detection metric and compares the result against a threshold to determine whether a potential target signal may be present. The operation of the Correlation component 314, the Noise Floor Estimation component 312, and the Metric Calculation component 316 may be repeated based on the second feature and a particular second tier channel output if the first feature based processing indicates that a potential target signal is present in one or more second tier channel outputs. The second feature based processing may be based on a particular second tier channel output that has a first feature match. Detection and noise floor related information may be provided to the Result component 318.

While the Correlation component 314 may operate in a sequential manner to perform feature-1 and feature-2 correlation on a particular second tier channel output, feature-1 and feature-2 correlations of second tier channel outputs corresponding to different groups of time samples may occur concurrently. For example, the Correlation component 314 may concurrently perform a feature-2 correlation of a particular second tier channel output that has a feature-1 match and a feature-1 correlation of another second tier channel output that was generated by the Tier-2 Channelizer 308 subsequent to the particular second tier channel output that has a feature-1 match. The Noise Floor Estimation component 312 and the Metric Calculation component 316 are configured to perform concurrent operation in a manner similar to the Correlation component 314. In an alternative embodiment, the Correlation component 314, the Noise Floor Estimation component 312, and the Metric Calculation component 316 may be dedicated to feature-1 processing and may be followed by another correlation component (not shown), another noise floor estimation component (not shown), and another metric calculation component (not shown) that are dedicated to feature-2 processing.

While the feature based correlation processing is described in terms of a first feature correlation processing followed by a second feature correlation processing, variations on the detection scheme may be supported, including searching for multiple first feature targets simultaneously at a low threshold, followed by immediate distinct first feature correlation for each target at a higher threshold, which may reduce loading of second feature correlation processing.

By channelizing the RF environment into search channels, target signals (e.g., target signals with less than 4 kHz bandwidth) can be recovered from a single second tier channel. Additionally, using two stages of coarse and fine feature based correlation processing enables efficient search of a large RF environment bandwidth without sacrificing performance. Further, every frequency in the bandwidth of the digitized RF environment may be covered at all times.

Figure 4:
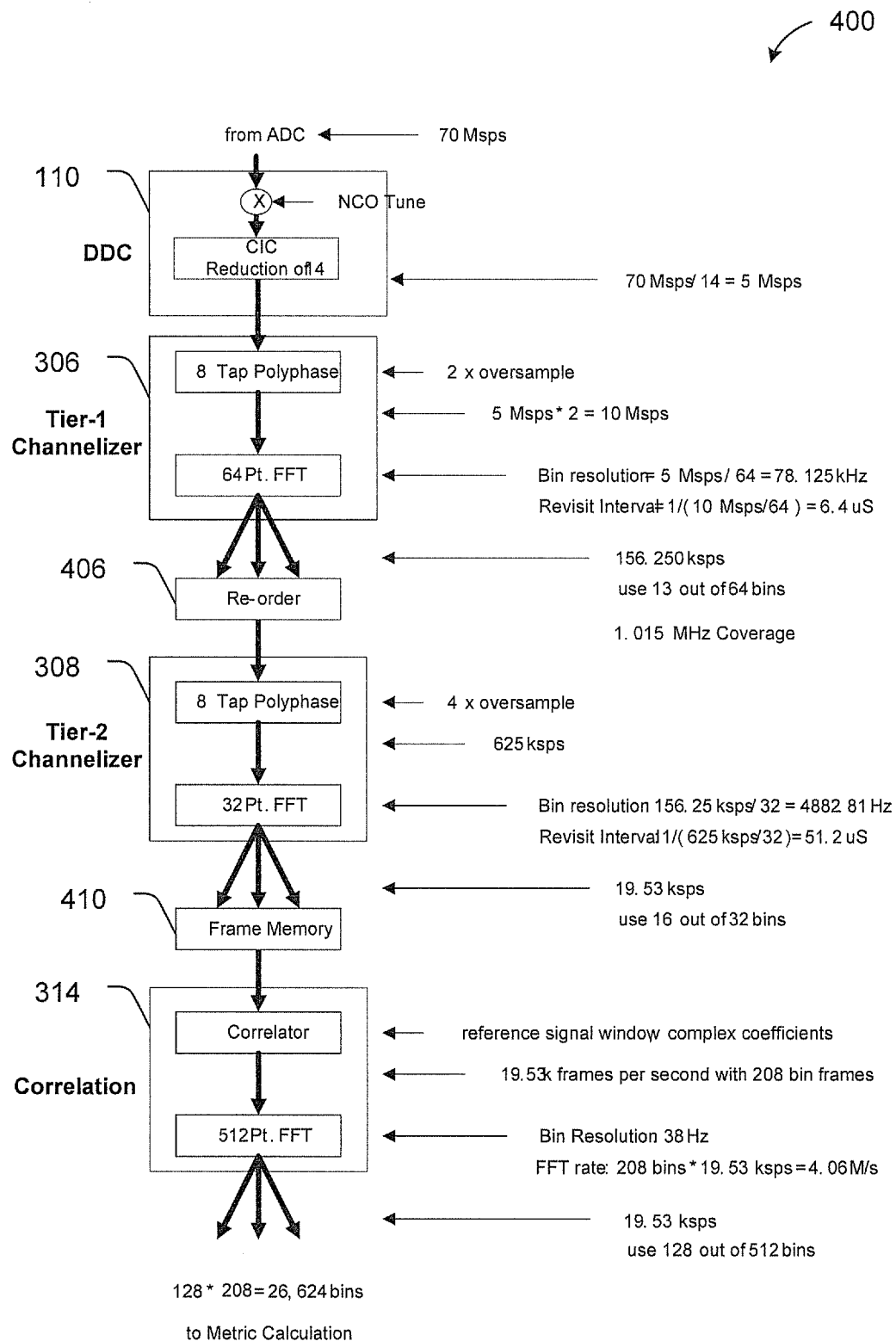
FIG. 4 is a block diagram of a second particular embodiment of a signal detection system.

FIG. 4 is a particular illustrative embodiment of a signal detection system 400. The signal detection system 400 includes the DDC 110 that is configured to receive a digital signal from an analog-to-digital converter, such as the ADC 108 of FIGS. 1 and 3. The DDC 110 is coupled to the Tier-1 Channelizer 306. The Tier-1 Channelizer 306 is coupled to a Re-order component 406 that is in turn coupled to the Tier-2 Channelizer 308. The output of the Tier-2 Channelizer 308 is provided to a Frame Memory 410 that is coupled to the Correlation component 314.

The DDC 110 may include a numerically-controlled oscillator (NCO) tuner and a cascaded integrator-comb (CIC) filter. In a particular embodiment, the DDC 110 may perform down-conversion via multiplication with a complex NCO followed by low pass filtering and decimation performed by the CIC filter with a rate reduction of about 14. The NCO tuner may be responsible for converting an input signal from the ADC to baseband and for separating the input signal into in-phase and quadrature components. The CIC filter may have a known low pass frequency response. Careful selection of the sample rate reduction may enable the frequency response to maintain acceptable passband response while providing good out of band spur suppression.

In a particular embodiment, at least one of the digitized RF environment and one or more of the first tier channel outputs may be channelized using sequential processors to implement polyphase filtering and buffering. The Tier-1 Channelizer 306 may include a polyphase filter and an FFT engine. In a particular embodiment, the Tier-1 Channelizer 306 implements a two times oversampled polyphase filter with a depth of eight followed by a 64 point FFT. The Re-order component 406 may provide temporary buffering and frame formatting functions. The Tier-2 Channelizer 308 similarly may include a polyphase filter and an FFT engine. In a particular embodiment, the Tier-2 Channelizer 308 implements a four times oversampled polyphase filter with a depth of eight followed by a 32 point FFT. A number of bins (each bin associated with a channel output generated by the Tier-1 FFT) may be dropped if the bandwidth of the entire FFT frame exceeds system requirements. Some Tier-2 associated bins may also be dropped prior to providing data to a Noise Floor Estimation component, such as the Noise Floor Estimation block 312 of FIG. 1 and to the Correlation component 314. Output of the Tier-2 Channelizer 308 may be stored in the Frame Memory 410 for retrieval by the Correlation component 314.

The Frame Memory 410 may be configured to enable retrieval of the Tier-2 channel outputs to enable both first feature based correlation processing and a potential second feature based correlation processing that may be performed based on a Tier-2 channel output that has a first feature match. In another embodiment, pre-summed, windowed blocks may be used rather than one or more of the polyphase filters. When the pre-summed, windowed blocks are used, an FFT-shifted widow function may be used rather than the Re-order component 406.

The Correlation component 314 may include a correlator and an FFT engine. As described with respect to FIG. 3, the Correlation component 314 is configured to perform a feature based correlation based on one or more of channel outputs from the Tier-2 Channelizer 308. The Correlation component 314 may perform both first feature and second feature correlations concurrently by operating on Tier-2 Channelizer 308 channel outputs that are generated in different time intervals. In an alternative embodiment, the Correlation component 314 may perform first feature correlations, and a different correlation component (not shown) may perform second feature correlations. The output of the Correlation component 314 is provided to a metric calculation component, such as the Metric Calculation component 316 of FIG. 3, to determine whether a potential target signal is present in a particular channel output of the Tier-2 Channelizer 308. Detection occurs when the metric calculation component indicates one or more bins from the 512 point FFT is above a threshold.

Figure 5:
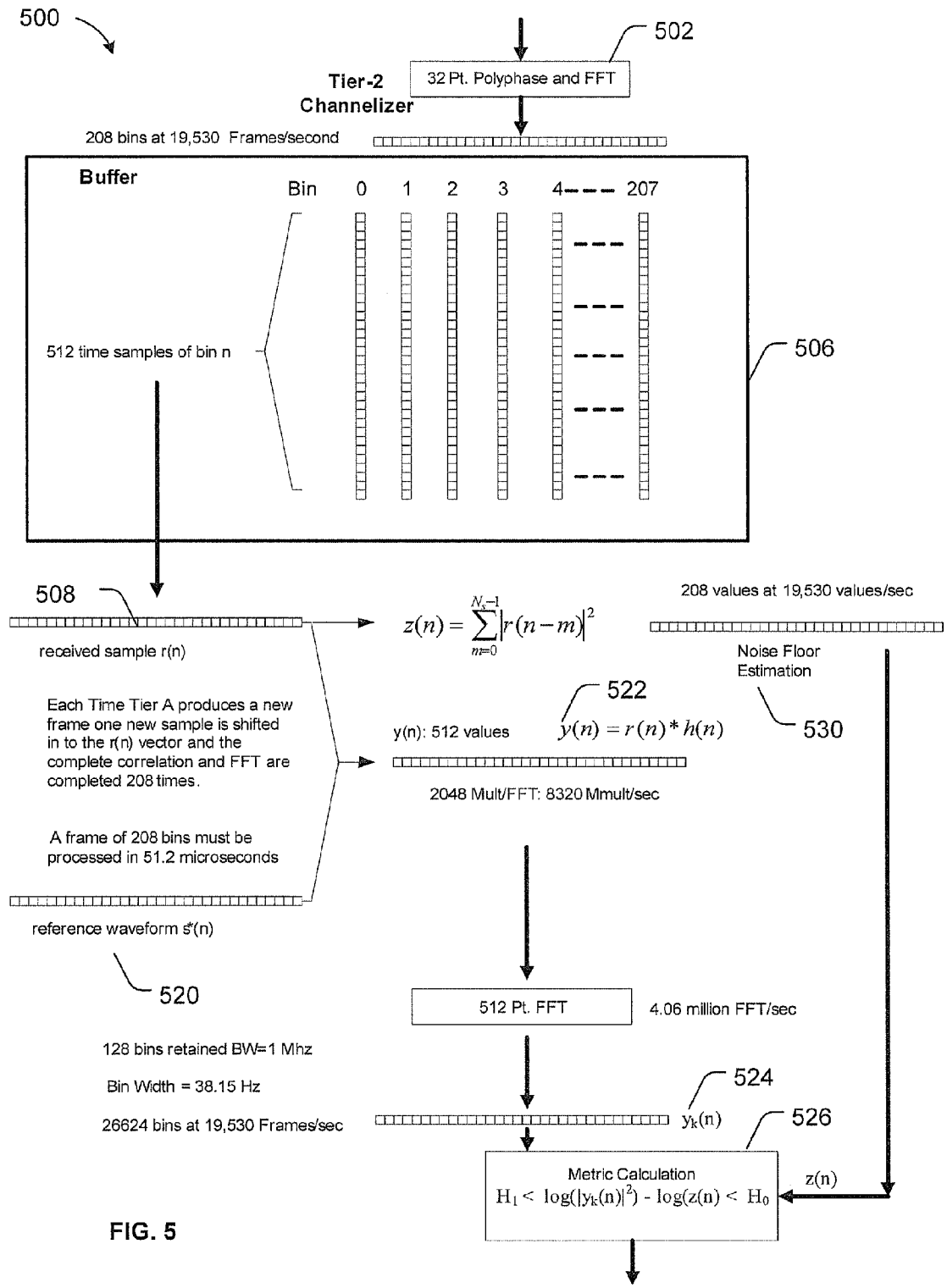
FIG. 5 is a diagram illustrating a particular embodiment of feature based correlation processing by a signal detection system.

FIG. 5 is an illustrative block diagram of a particular embodiment of feature based correlation processing by a signal detection system 500. Operations shown with respect to the signal detection system 500 correspond to operations of a correlation component, a noise floor estimation component, and a metric calculation component, such as the Correlation component 314, the Noise Floor Estimation component 312, and the Metric Calculation component 316 of FIG. 3.

In a particular embodiment, at the start of the process, a number of samples (e.g., five hundred twelve (512) samples in the particular example illustrated in FIG. 5) of a number of bins (e.g., 208 bins in the particular example illustrated in FIG. 5) are received (for example, in a pipelined manner) at a buffer 506 from a Tier-2 Channelizer 502. The received samples, r(n) 508, from a first bin (e.g., bin 0) are multiplied against a reference waveform, s*(n) 520 (e.g., a 512 element reference waveform in the particular example illustrated in FIG. 5). The resulting vector of values, y(n) 522, is processed via FFT to generate $y_k(n)$ 524. The magnitude squared values of the $y_k(n)$ 524 are then calculated. Each $|y_k(n)|^2$ is then used by the Metric Calculation component 526. Continuing with the next bin (e.g., bin 1), the process is repeated starting with multiplying the received samples r(n) 508 against the reference waveform s*(n) 520. After all of the bins have been processed as described above, the process repeats starting with the bin (e.g., bin 0) that was processed first in the prior cycle. A transfer of a new frame Tier-2 frame into the buffer 506 occurs once every cycle of the bins (e.g., after 208 bins have been processed in the particular example of FIG. 5). For example, a new Tier-2 frame may be transferred into the buffer 506 approximately every 51.2 microseconds.

The Noise Floor Estimation component 530 estimates a background noise level using a sliding window including one or more of the second tier channel outputs. The magnitude squared $|r(n)|^2$ of each bin is calculated as it arrives. A number of samples (e.g., 512 samples in the particular embodiment illustrated in FIG. 5) of $|r(n)|^2$ are averaged and stored, for example in a shift register, as they arrive to produce an average value for the bin over time samples. In a particular embodiment, per bin average is calculated over the bins associated with the non-zero samples in the reference waveform. The process is repeated until all of the bins (e.g., all 208 bins in the particular example of FIG. 5) are covered. The average values z(n) are then provided to the Metric Calculation component 526. When a new Tier-2 frame arrives at the buffer 506, the oldest value is subtracted and a new value is added to calculate the average for a particular bin, which is repeated until all of the bins are covered.

At the Metric Calculation component 526, the $|y_k(n)|^2$ values and the z(n) values may be converted to dB. For a given value of n, a difference vector may be calculated as $d(k)=\log(|y_k(n)|^2)-\log(z(n))$ over all values of k. The calculation of d(k) is repeated for a total number of times corresponding to the number of bins (e.g., 208 times corresponding to the 208 bins in the particular example of FIG. 5). A determination of whether a potential target signal is present is made for every value of k.

While FIG. 5 illustrates a single reference waveform based processing, the operations of feature-1 processing and feature-2 processing described with respect to FIGS. 1-3 may be implemented in a similar manner. Additionally, the number of bins may be greater or fewer than 208. Further, FFT other than 512 point FFT may be used.

By processing the Tier-2 channel outputs as described, sample-by-sample or block-by-block operation results in very low latencies starting from the analog to digital conversion to a detection of the target signal, such as the target signal 104 of FIG. 1.

Figure 6:
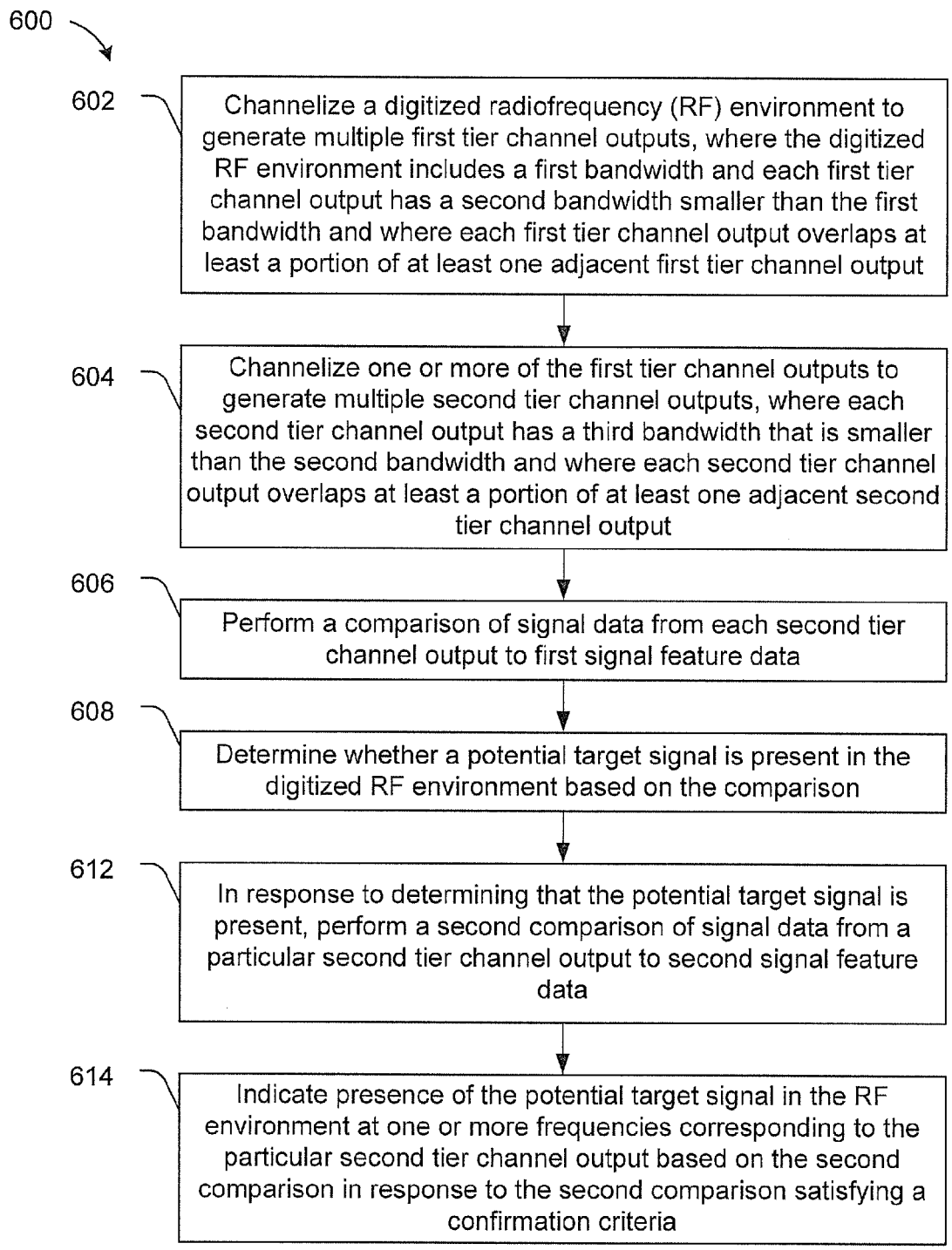
FIG. 6 is a flow diagram of a particular embodiment of a method of signal detection.

FIG. 6 is a first particular illustrative embodiment of a method of detecting a target signal in a wideband, cluttered RF noise environment by exploiting known segments of the target signal. The target signal may have an unknown transmission time, an unknown frequency, an unknown amplitude, an unknown phase, or a combination thereof. The method 600 includes channelizing a digitized radio frequency (RF) environment to generate multiple first tier channel outputs, at 602. For example, the processor 112 and the Tier-1 Channelizer 306 of FIGS. 2 and 3 may channelize a digitized RF environment, such as the DDC output 202 of FIG. 2, to generate multiple first tier channel outputs. The digitized RF environment has a first bandwidth. For example, the DDC output 202 of FIG. 2 may have a 2 MHz bandwidth. Each first tier channel output may have a second bandwidth that is smaller than the first bandwidth, and each first tier channel output may overlap at least a portion of at least one adjacent first tier channel output. For example, the multiple first tier channel outputs 220 of FIG. 2 may be 78.125 kHz apart (center to center), and each first tier channel output may cover an 84.625 kHz (i.e., 78.125 kHz+6.50 kHz) bandwidth.

One or more of the first tier channel outputs may be channelized to generate multiple second tier channel outputs, at 604. For example, the processor 112 and the Tier-2 Channelizer 308 of FIGS. 2 and 3 may channelize one or more first tier channel outputs to generate multiple second tier channel outputs. Each second tier channel output may have a third bandwidth that is smaller than the second bandwidth. To illustrate, each first tier channel output may cover an 84.625 kHz bandwidth while each second tier channel output may have a 6.5 kHz bandwidth. Each second tier channel output may overlap at least a portion of at least one adjacent second tier channel output.

A comparison of signal data from each second tier channel output to first signal feature data may be performed, at 606. For example, the processor 112 of FIG. 1 may perform a comparison of signal data from each second tier channel output to first signal feature data (e.g., feature-1). The method 600 may also include determining whether a potential target signal is present in the digitized RF environment based on the comparison. For example, the processor 112 of FIG. 1 and the Metric Calculation component 316 of FIG. 3 may determine whether a potential target signal is present in the digitized RF environment based on the comparison of signal data from each second tier channel output to first signal feature data.

In response to determining that the potential target signal is present, a second comparison of signal data from a particular second tier channel output to second signal feature data may be performed. For example, the processor 112 of FIG. 1 and the Correlation component 314 of FIGS. 3 and 4 may perform a comparison of signal data from each second tier channel output to second signal feature data (e.g., feature-2). In response to the second comparison satisfying a confirmation criterion, the processor 112 may indicate presence of the potential target signal in the RF environment at one or more frequencies corresponding to a particular second tier channel output based on the second comparison. To example, the processor 112 may indicate the presence of the potential target signal in the RF environment.

Indicating the presence of the potential target signal in the RF environment at one or more frequencies corresponding to the particular second tier channel output may include triggering an alarm signal. A direction finding process to determine a direction to a source of the potential target signal may be initiated when the presence of the potential target signal in the RF environment is indicated. A countermeasure in a frequency range including at least the one or more frequencies corresponding to the particular second tier channel output may also be initiated when the presence of the potential target signal in the RF environment is indicated.

Accordingly, by performing a two-tier channelization as described, a target signal with unknown transmission time, unknown frequency, unknown amplitude, unknown phase, or a combination thereof, in a wideband, cluttered RF noise environment may be detected by exploiting known segments of the target signal.

Figure 7:
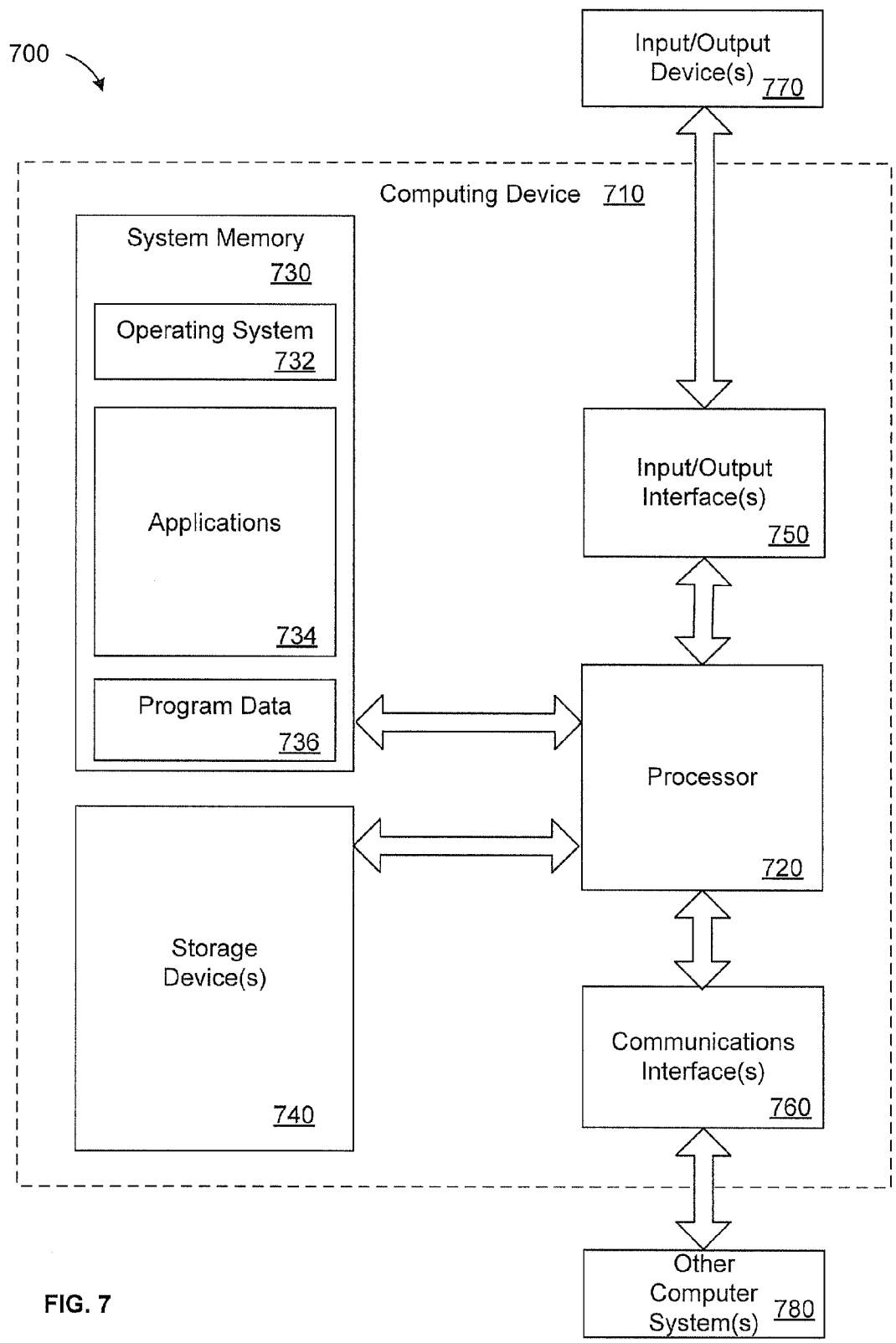
FIG. 7 is a block diagram of an illustrative embodiment of a general computer system.

FIG. 7 is a block diagram of a computing environment 700 including a general purpose computing device 710 operable to support embodiments of computer-implemented methods and computer-executable program instructions according to the present disclosure. The computing device 710 typically includes at least one processor 720. Within the computing device 710, the processor 720 communicates with a system memory 730, one or more storage devices 740, one or more input/output interfaces 750, and one or more communications interfaces 760.

The system memory 730 may include volatile memory devices (e.g., random access memory (RAM) devices), non-volatile memory devices (e.g., read-only memory (ROM) devices, programmable read-only memory, and flash memory), or both. The system memory 730 typically includes an operating system 732, which may include a basic/input output system for booting the computing device 710 as well as a full operating system to enable the computing device 710 to interact with users, other programs, and other devices. The system memory 730 also typically includes one or more application programs 734, such as an application program to perform signal processing as described above. The system memory 730 also may include program data 736.

The processor 720 may also communicate with one or more storage devices 740. For example, the one or more storage devices 740 may include nonvolatile storage devices, such as magnetic disks, optical disks, or flash memory devices. The storage devices 740 may include both removable and non-removable memory devices. The storage devices 740 may be configured to store an operating system, applications, and program data. In a particular embodiment, the system memory 730, the storage devices 740, or both, include tangible, non-transitory computer-readable media.

The processor 720 may also communicate with one or more input/output interfaces 750 that enable the computing device 710 to communicate with one or more input/output devices 770 to facilitate user interaction. The input/output interfaces 750 may include serial interfaces (e.g., universal serial bus (USB) interfaces or IEEE 1394 interfaces), parallel interfaces, display adapters, audio adapters, and other interfaces. The input/output devices 770 may include keyboards, pointing devices, displays, speakers, microphones, touch screens, and other devices.

The processor 720 may communicate with other computer systems 780 via the one or more communications interfaces 760. The one or more communications interfaces 760 may include wired Ethernet interfaces, IEEE 802.01 wireless interfaces, Bluetooth communication interfaces, or other network interfaces. The other computer systems 780 may include host computers, servers, workstations, and other computing devices.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A computer-implemented method for detecting a signal, the method comprising:
channelizing a digitized radio frequency (RF) environment to generate multiple first tier channel outputs, wherein the digitized RF environment includes a first bandwidth and each of the multiple first tier channel outputs has a second bandwidth smaller than the first bandwidth, and wherein each of the multiple first tier channel outputs overlaps at least a portion of at least one adjacent first tier channel output;
channelizing one or more of the multiple first tier channel outputs to generate multiple second tier channel outputs, wherein each of the multiple second tier channel outputs has a third bandwidth that is smaller than the second bandwidth, and wherein each of the multiple second tier channel outputs overlaps at least a portion of at least one adjacent second tier channel output;
performing a comparison of signal data from each of the multiple second tier channel outputs to first signal feature data; and
determining whether a potential target signal is present in the digitized RF environment based on the comparison, wherein the comparison comprises a first cross-correlation of the signal data from each of the multiple second tier channel outputs to the first signal feature data, and wherein the potential target signal is determined to be present when the first cross-correlation satisfies a first threshold.

2. The method of claim 1, further comprising digitizing one or more portions of the RF environment before channelizing the digitized RF environment, wherein digitizing the one or more portions of the RF environment includes one or more of down converting, frequency shifting, low pass filtering, and decimating.

3. The method of claim 1, wherein the potential target signal is recoverable from a single second tier channel output of the multiple second tier channel outputs without distortion.

4. The method of claim 1, wherein each of the multiple second tier channel outputs has a passband bandwidth corresponding to a sum of a bandwidth of a target signal and a separation between channels of the multiple second tier channel outputs.

5. The method of claim 1, wherein the potential target signal is recoverable from a single first tier channel output without distortion.

6. The method of claim 1, wherein at least one of the digitized RF environment and the one or more of the multiple first tier channel outputs is channelized using sequential processors to implement polyphase filtering and buffering.

7. The method of claim 1, further comprising, in response to determining that the potential target signal is present:
performing a second comparison of signal data from a particular second tier channel output of the multiple second tier channel outputs to second signal feature data; and
indicating presence of the potential target signal in the RF environment at one or more frequencies corresponding to the particular second tier channel output of the multiple second tier channel outputs based on the second comparison in response to the second comparison satisfying a confirmation criterion.

8. The method of claim 7, wherein indicating the presence of the potential target signal in the RF environment at one or more frequencies corresponding to the particular second tier channel output of the multiple second tier channel outputs includes triggering an alarm signal.

9. The method of claim 7, further comprising initiating a direction finding process to determine a direction to a source of the potential target signal when the presence of the potential target signal in the RF environment is indicated.

10. The method of claim 7, further comprising initiating a countermeasure in a frequency range including at least the one or more frequencies corresponding to the particular second tier channel output of the multiple second tier channel outputs when the presence of the potential target signal in the RF environment is indicated.

11. The method of claim 7, wherein the first signal feature data corresponds to a first portion of a training sequence of the potential target signal and the second signal feature data corresponds to a second portion of the training sequence of the target signal, wherein the first portion and the second portion are not identical.

12. The method of claim 11, wherein the second portion is larger than the first portion.

13. The method of claim 7, further comprising, in response to the indication of the presence of the potential target signal in the RF environment at one or more frequencies corresponding to the particular second tier channel output of the multiple second tier channel outputs:
   demodulating data received via the one or more frequencies corresponding to the particular second tier channel output of the multiple second tier channel outputs to generate demodulated data;
   performing error correction of the demodulated data to form error-corrected data;
   performing an analysis of the error-corrected data; and
   indicating presence of the potential target signal in the RF environment based on the analysis of the error-corrected data.

14. A system comprising:
   at least one processor; and
   memory accessible to the at least one processor, wherein the memory stores computer-executable instruction that, when executed by the at least one processor, cause the at least one processor to:
   channelize a digitized radio frequency (RF) environment to generate multiple first tier channel outputs, wherein the digitized RF environment includes a first bandwidth and each of the multiple first tier channel outputs has a second bandwidth smaller than the first bandwidth, and wherein each of the multiple first tier channel outputs overlaps a first-portion of at least one adjacent first tier channel output;
   channelize one or more of the multiple first tier channel outputs to generate multiple second tier channel outputs, wherein each of the multiple second tier channel outputs has a third bandwidth that is smaller than the second bandwidth, and wherein each of the multiple second tier channel outputs overlaps a portion of at least one adjacent second tier channel output;
   perform a first comparison of signal data from each of the multiple second tier channel outputs to first signal feature data; and
   determine whether a potential target signal is present in the digitized RF environment based on the first comparison, wherein the first comparison comprises a first cross-correlation of the signal data from each of the multiple second tier channel outputs to the first signal feature data, and
   wherein the potential target signal is determined to be present when the first cross-correlation satisfies a first threshold.

15. The system of claim 14, wherein the potential target signal is recoverable from a single first tier channel output without distortion.

16. The system of claim 14, wherein, in response to determining that the potential target signal is present, the computer-executable instruction, when executed by the at least one processor, further causes the at least one processor to:
   perform a second comparison of signal data from a particular second tier channel output of the multiple second tier channel outputs to second signal feature data; and
   indicate presence of the potential target signal in the RF environment at one or more frequencies corresponding to the particular second tier channel output of the multiple second tier channel outputs based on the second comparison.

17. The system of claim 16, wherein the second comparison comprises a second cross-correlation of the particular second tier channel output of the multiple second tier channel outputs to the second signal feature data, and wherein the potential target signal is indicated to be present when the second cross-correlation satisfies a second threshold.

18. A non-transitory computer-readable medium comprising computer-executable instructions that, when executed by a processor, cause the processor to:
   channelize a digitized radio frequency (RF) environment to generate multiple first tier channel outputs, wherein the digitized RF environment has a first bandwidth and each of the first tier channel outputs has a second bandwidth smaller than the first bandwidth, and wherein each first tier channel output overlaps a first portion of at least one adjacent first tier channel output;
   channelize one or more of the multiple first tier channel outputs to generate multiple second tier channel outputs, wherein each of the multiple second tier channel outputs has a third bandwidth that is smaller than the second bandwidth, and wherein each second tier channel output overlaps a portion of at least one adjacent second tier channel output;
   perform a first comparison of signal data from each of the multiple second tier channel outputs to first signal feature data; and
   determine whether a potential target signal is present in the digitized RF environment based on the first comparison; and
   in response to determining that the potential target signal is present:
   performing a second comparison of signal data from a particular second tier channel output of the multiple second tier channel outputs to second signal feature data; and
   indicating presence of the potential target signal in the RF environment at one or more frequencies corresponding to the particular second tier channel output of the multiple second tier channel outputs based on the second comparison in response to the second comparison satisfying a confirmation criterion.

19. A computer-implemented method for detecting a signal, the method comprising:
   channelizing a digitized radio frequency (RF) environment to generate multiple first tier channel outputs, wherein the digitized RF environment includes a first bandwidth and each of the multiple first tier channel outputs has a second bandwidth smaller than the first bandwidth, and wherein each of the multiple first tier channel output overlaps at least a first portion of at least one adjacent first tier channel outputs;
   channelizing one or more of the multiple first tier channel outputs to generate multiple second tier channel outputs, wherein each of the multiple second tier channel outputs has a third bandwidth that is smaller than the second bandwidth, and wherein each of the multiple second tier channel outputs overlaps at least a portion of at least one adjacent second tier channel output;
   performing a first comparison of signal data from each of the multiple second tier channel outputs to first signal feature data; and determining whether a potential target signal is present in the digitized RF environment based on the first comparison; and in response to determining that the potential target signal is present:

performing a second comparison of signal data from a particular second tier channel output of the multiple second tier channel outputs to second signal feature data; and indicating presence of the potential target signal in the RF environment at one or more frequencies corresponding to the particular second tier channel output of the multiple second tier channel outputs based on the second comparison in response to the second comparison satisfying a confirmation criterion.

20. A system comprising:

at least one processor; and memory accessible to the at least one processor, wherein the memory stores computer-executable instruction that, when executed by the at least one processor, cause the at least one processor to:

channelize a digitized radio frequency (RF) environment to generate multiple first tier channel outputs, wherein the digitized RF environment includes a first bandwidth and each of the multiple first channel outputs has a second bandwidth smaller than the first bandwidth, and wherein each of the multiple first tier channel outputs overlaps a portion of at least one adjacent first tier channel output;

channelize one or more of the multiple first tier channel outputs to generate multiple second tier channel outputs, wherein each of the multiple second tier channel outputs has a third bandwidth that is smaller than the second bandwidth, and wherein each of the multiple second tier channel outputs overlaps a portion of at least one adjacent second tier channel output;

perform a first comparison of signal data from each of the multiple second tier channel outputs to first signal feature data; and determine whether a potential target signal is present in the digitized RF environment based on the first comparison; and in response to determining that the potential target signal is present:

performing a second comparison of signal data from a particular second tier channel output of the multiple second tier channel outputs to second signal feature data; and indicating presence of the potential target signal in the RF environment at one or more frequencies corresponding to the particular second tier channel output of the multiple second tier channel outputs based on the second comparison in response to the second comparison satisfying a confirmation criterion.

* * * * *